United States Patent [19]

Evans

[11] 4,177,101
[45] Dec. 4, 1979

[54] METHOD AND APPARATUS FOR LAMINATING PANELS

[75] Inventor: Ralph M. Evans, Phoenix, Ariz.

[73] Assignee: Evans Rotork, Inc., Glendale, Ariz.

[21] Appl. No.: 870,608

[22] Filed: Jan. 19, 1978

[51] Int. Cl.² .......................... B32B 31/00; C09J 7/00
[52] U.S. Cl. ..................................... 156/300; 156/313; 156/563
[58] Field of Search ............... 156/313, 300, 563, 578, 156/291

[56] References Cited

U.S. PATENT DOCUMENTS

| | | | |
|---|---|---|---|
| 3,765,993 | 10/1973 | Raffensparger | 156/563 |
| 3,785,508 | 1/1974 | Hayden | 156/563 |

*Primary Examiner*—Douglas J. Drummond
*Attorney, Agent, or Firm*—Cahill, Sutton & Thomas

[57] ABSTRACT

A substrate to be laminated is passed from a feed and brush table through an adhesive spreader, which spreader applies a pattern of adhesive along the top and bottom surfaces of the substrate. An index table, having a plurality of supporting rollers, supports a bottom laminate to be adhered to the bottom of the substrate at a predetermined indexed location. The substrate is transported onto the indexing table to a predetermined indexed location while being supported along its longitudinal edges by cone-shaped rollers to maintain undisturbed the pattern of adhesive. At the indexed location, the substrate drops onto the underlying laminate in predetermined relationship thereto. A top laminate to be adhered to the top surface of the substrate is positionally indexed on the index table and lowered onto the substrate. The composite substrate and laminate unit is conveyed through a heat tunnel which applies heat and includes compressive rollers for applying progressive compression upon the composite unit to cure the adhesive. Trimmers at the exit of the heat tunnel trim the top and bottom laminates to the substrate width.

42 Claims, 9 Drawing Figures

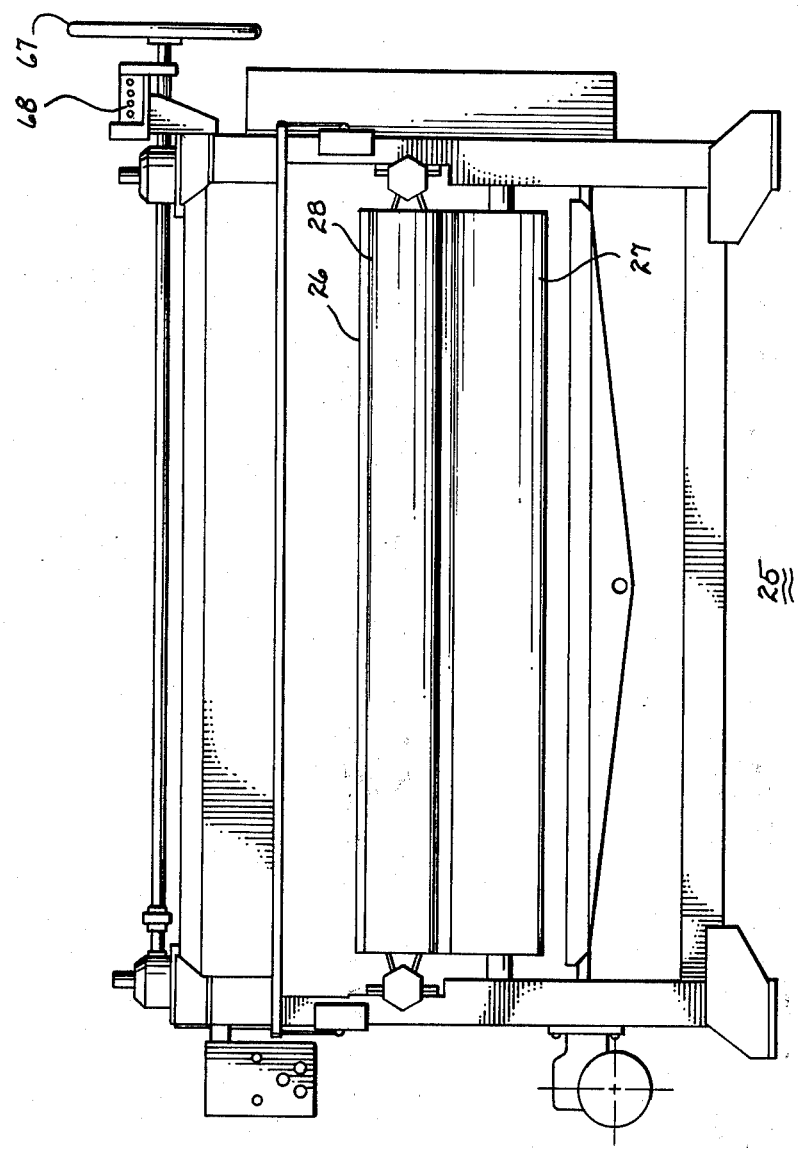
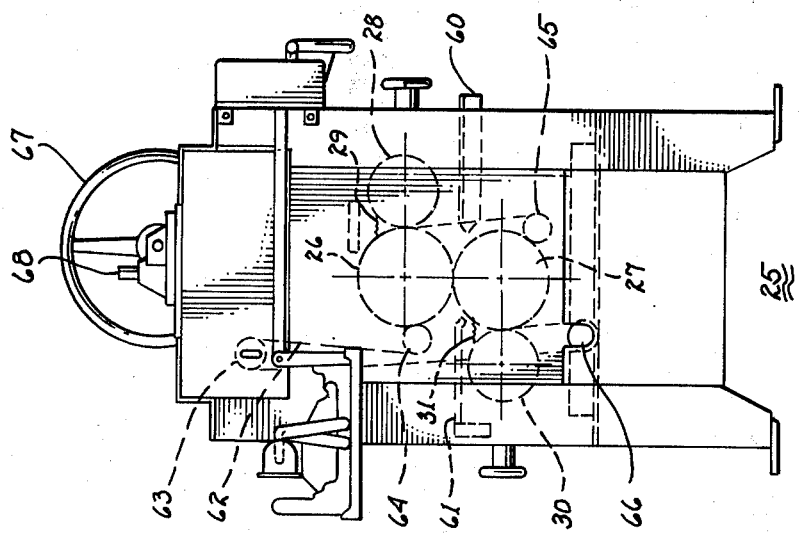
fig. 3
fig. 4

METHOD AND APPARATUS FOR LAMINATING PANELS

The present invention relates to a laminating apparatus and a process therefor and, more particularly, to apparatus and process for applying laminates to opposed surfaces of a substrate.

The formation of composite structures having a substrate and one or more adhesively attached laminates has embraced the use of contact adhesives. Such adhesives generally include a highly volatile carrier to reduce the "drying" time preparatory to the joining of the laminate(s) and substrate. The fumes attendant release of the carrier are noxious and often present a health hazard. Water based contact adhesives have also been used to avoid health hazards but the initial drying time is substantially increased to the detriment of production speed. White glues, such as PVA, alphatic resin base and casein base are preferred for wood and wood composite substrates and laminates from both the standpoint of joint strength and the lack of toxic components and noxious fumes. But, these adhesives, until cured, will not maintain the laminates and substrate in alignment although these adhesives provide the strongest joint if the glued elements are clamped.

Various apparatus have been developed for adhesively securing a laminate to a substrate. One such method contemplates the application of adhesive to a surface of the substrate and placing the laminate upon the prepared substrate surface. Should the adhesive be of the contact type, any misalignment may ruin the final product. Other adhesives require clamping, which may be effected by stacking the laminated units—such stacking for curing the adhesive is time consuming and requires substantial labor and work space. Where opposed sides of a substrate are to be laminated, the above procedures and times must be doubled. The teachings in U.S. Pat. No. 1,851,709 are representative of apparatus for effecting the above described laminating processes.

For flexible substrates and laminates, a continuous process, such as described in U.S. Pat. No. 2,545,370 may be employed. However, the apparatus described therein is not useable with rigid or semi-rigid substrates and laminates.

In the present invention, a substrate, after being vacuumed and/or brushed clean, is passed through a glue spreader wherein adhesive is applied to opposed surfaces of the substrate. An index table supports, in predetermined location, a laminate upon rollers. The adhesively prepared substrate is discharged from the glue spreader onto the index table to a predetermined location with respect to the laminate while being supported along its longitudinal edges to preclude disturbance with the applied adhesive. On reaching the predetermined location, the substrate is indexed with respect to and dropped upon the underlying laminate. A second laminate to be adhesively attached to the upper surface of the substrate is keyed to a predetermined location upon the index table, which location indexes the second laminate to the underlying substrate. Thereafter, the second laminate is dropped onto the upper surface of the substrate. While supported on the rollers, the composite unit is conveyed into a heat tunnel. The heat tunnel includes a plurality of sets of opposed pressure rollers for translating the composite unit through the heat tunnel while simultaneously applying a compressive force to clamp the laminates to the substrate. A plurality of heat sources supply heat to accelerate curing of the adhesive and achieve complete cure thereof on discharge of the unit from the heat tunnel. The sets of pressure rollers may apply progressively greater compressive force or uniform compressive force, depending upon the type and nature of the adhesives, the laminates and the substrate. Trimmers disposed at the discharge end of the heat tunnel trim the edges of the composite unit.

It is therefore a primary object of the present invention to provide apparatus for adhering laminates to opposed surfaces of a substrate.

Another object of the present invention is to provide a method for attaching laminates to opposed surfaces of a substrate by single steps of applying adhesive to the opposed surfaces of the substrate, joining the laminates to the substrate and curing the adhesive.

Yet another object of the present invention is to provide an index table for joining laminates to opposed surfaces of a substrate in an indexed relationship.

Still another object of the present invention is to provide an index table for sequentially joining laminates in a predetermined relationship to opposed adhesive coated surfaces of a substrate.

A further object of the present invention is to provide apparatus for adhering laminates to opposed surfaces of a substrate with white glue while maintaining alignment of the laminates during curing of the white glue.

A yet further object of the present invention is to provide a process for attaching laminates to a substrate with non-toxic adhesives.

A still further object of the present invention is to provide a heat tunnel for rapidly curing and continuously applying pressure to a composite unit translated therethrough.

These and other objects of the present invention will become apparent to those skilled in the art as the description thereof proceeds.

The present invention may be described with greater specificity and clarity with reference to the following drawings, in which:

FIG. 3 is an end view of a glue spreader taken along lines 3—3, as shown in FIG. 2;

FIG. 4 is a side view of the glue spreader;

Figure 1:
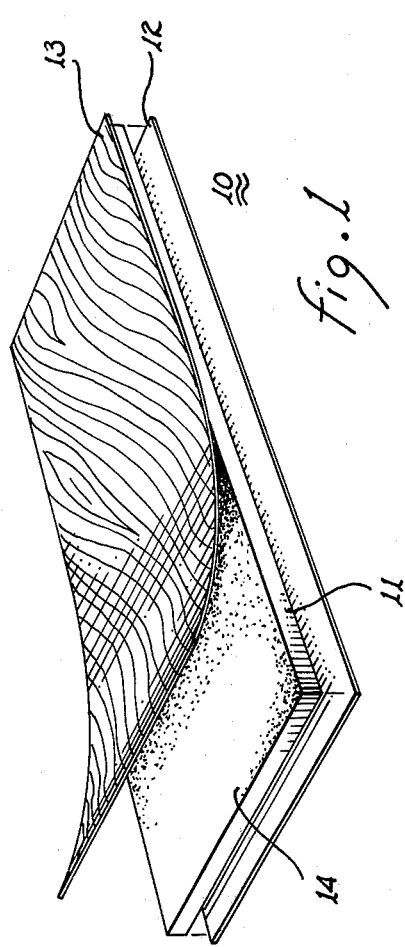
FIG. 1 is an isometric view of a double laminated substrate.

FIG. 1 illustrates an isometric representation of a composite unit 10 produced through operation of the present invention. A substrate 11 is disposed intermediate bottom and top laminates 12 and 13, respectively. During assembly, the laminates are purposely greater in width than the substrate in order to allow trimming of their edges to remove any nicks or scars therealong which may have occurred in handling/transportation of the laminates. Thereby, the roughened edges of the laminates, being trimmed off, will not mar the aesthetic effect of composite units. Adhesive 14, as shown along the top surface of substrate 11, may be of many types, including those previously unsuitable because they required extended curing times or tended to shrink, warp, curl or otherwise affect the laminate during curing.

Figure 2:
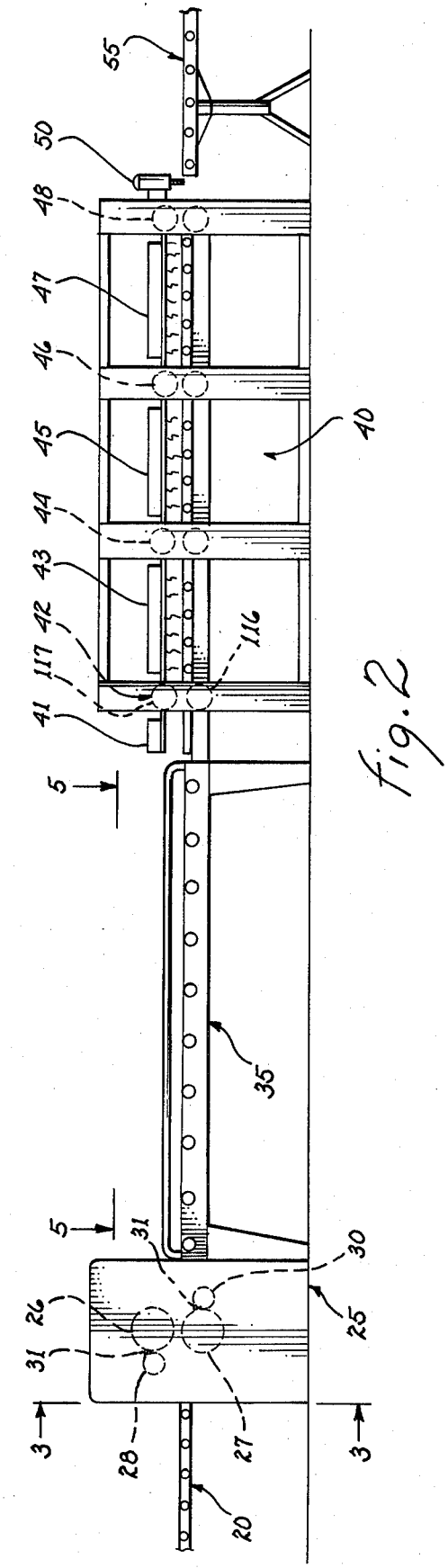
FIG. 2 is an elevational view of the components effecting operation of the present invention.

Referring to FIG. 2, there is illustrated the various apparatus employed to carry out the present invention. A representatively depicted feed table 20 includes roller means for transporting a substrate to be laminated and brush means for removing dirt and dust from the top and bottom surfaces of the substrate. Equipment of this type is readily commercially available.

The feed table transports the substrate into a top and bottom adhesive spreader 25. A spreader of the type readily useable with the present invention is a Model 22-D-56" series "875" manufactured by Black Brothers of 501 9th Avenue, Mendota, Ill. A substrate passing through spreader 25 is disposed intermediate upper laminating roll 26 and bottom laminating roll 27. These rolls perform the functions of applying beads or a pattern of adhesive along the top and bottom surfaces of the substrate while simultaneously transporting the substrate through the spreader. A doctor roll 28, associated with upper laminating roll 26, maintains a trough of adhesive 29 intermediate the two rolls and from which trough, adhesive is continuously supplied to the laminating roll for application upon the top surface of the substrate. A doctor roll 30 cooperates with lower laminating roll 27 to maintain a trough of adhesive 31 therebetween. This trough serves as a reservoir for supplying adhesive to lower laminating roll 27, wherefrom the adhesive is applied to the bottom surface of the substrate.

As the substrate exits from spreader 25, a pattern or beads of adhesive are disposed longitudinally along both the upper and bottom surfaces thereof.

Indexing table 35 serves the purpose of first receiving a bottom laminate in a predetermined location to mate with the bottom surface of an adhesively prepared substrate. The substrate, discharged from the spreader, is positioned in a predetermined location indexed to the bottom laminate and is dropped into place. During positioning of the substrate the patterns or beads of adhesive are undisturbed. A top laminate is positioned in a predetermined location indexed to the substrate and dropped into place upon the top surface of the substrate and in indexed relationship thereto. After the top and bottom laminates have been indexed to and mated with the substrate, the composite unit is transported from indexing table 35 to heat tunnel 40.

The heat tunnel serves two functions of simultaneously accelerating the curing of the adhesive while maintaining the top and bottom laminates pressed or clamped against the respective surfaces of the substrate. This combination of functions eliminates potential warping, curling or other deformation of the laminates because of contraction/expansion of the laminates due to the adhesive used. Moreover, it avoids the necessity of using toxic and/or highly volative contact adhesives to obtain high speed of manufacture. Thereby, the selection of adhesive may be based upon considerations of cost, permanency of the bond, strength of the bond and other such positive factors instead of considering only adhesives which will not physically deform the laminate during the curing process or present health hazards to the workmen.

The heat tunnel includes a preheater 41 for initially warming the composite unit. The composite unit is transported by and compressed intermediate first set of opposed pressure rollers 42. These rollers, their construction and their operation may be the same as or equivalent to the paired set of rollers described in U.S. Pat. No. 3,498,215 issued Mar. 3, 1970, and assigned to the present assignee. Subsequent to the first set of rollers, the composite unit is subjected to the heat from heating element 43 and passes to a second set of opposed pressure rollers 44. Further heating and compressing are effected consecutively by heating element 45, pressure rollers 46, heating element 47 and pressure rollers 48. Each consecutive set of pressure rollers may be adjusted to apply increasingly greater pressure or they may exert uniform pressure, depending upon considerations such as the thickness of the laminate, type of laminate, type of substrate and type of adhesive employed.

As the composite unit exits from heat tunnel 40, the laterally extending edges of the top and bottom laminates are trimmed to the width of the substrate by trimmers, such as trimmer 50.

A receiving table 55, which may be of conventional roller construction, receives the composite units discharged from the heat tunnel and the trimmers. In one embodiment of the present invention, the receiving table may be a stacking table whereby a plurality of composite units are automatically stacked one upon another after discharge from the heat tunnel.

FIGS. 3 and 4 illustrate the in-feed view and a partial cross-sectional view, respectively, of spreader 25. A brushed substrate from feed table 20 is conveyed onto feed table 60, which table orients and directs the substrate intermediate laminating rolls 26 and 27. These rolls are vertically adjustable to apply a predetermined pressure upon opposed surfaces of the panel while simultaneously applying adhesive to the top and bottom surfaces of the substrate in a bead or other pattern, depending upon the surface configuration of the rollers. A plurality of out-feed fingers 61, positionally arranged to minimize disturbance of the adhesive pattern applied to the bottom surface of the substrate, support the substrate during discharge from the spreader.

A chain 62, driven by a sprocket 63 attached to a motor (not shown), applies power to laminating rolls 26 and 27 by means of sprockets 64, 65, and 66. Doctor rolls 28 and 30 are rotated through the surface contact with the corresponding laminating rolls. By techniques well known to those skilled in the art, the adhesive is continually supplied intermediate each pair of laminating and doctor rolls to establish troughs 29 and 31 of adhesive. A hand wheel 67 is used to adjust the vertical height of laminating roll 26 to correspond with the substrate to which adhesive is to be supplied; an indicator, such as indicator 68, indicates the spacing intermediate the laminating rolls. Additional ancillary equipment, such as drip pan 69 may also be incorporated.

Figure 6:
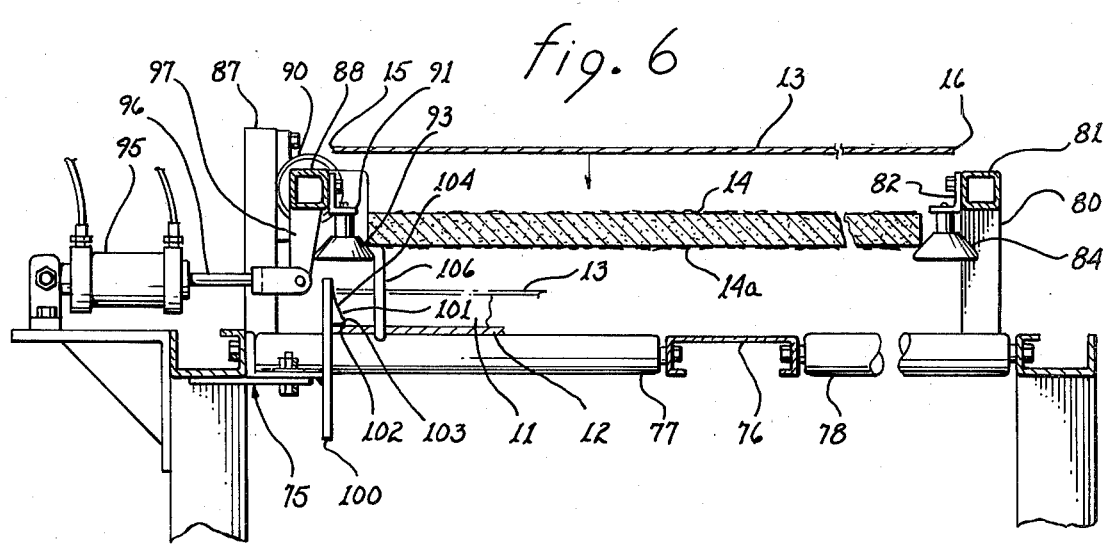
FIG. 6 is a cross-sectional view of the index table taken along lines 6—6, as shown in FIG. 5.
Figure 5:
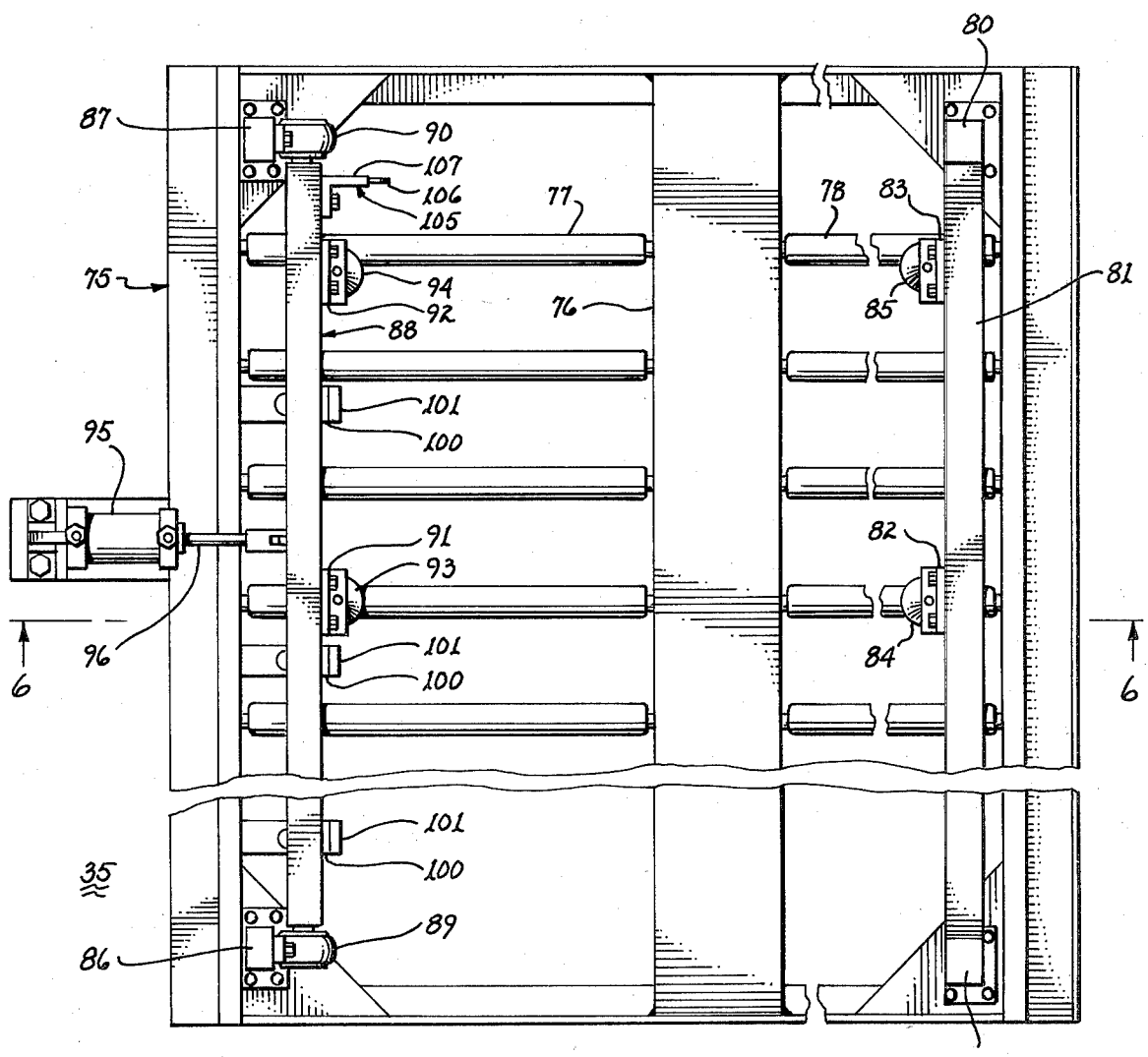
FIG. 5 is a top view of an index table taken along lines 5—5, as shown in FIG. 2.
Figure 7:
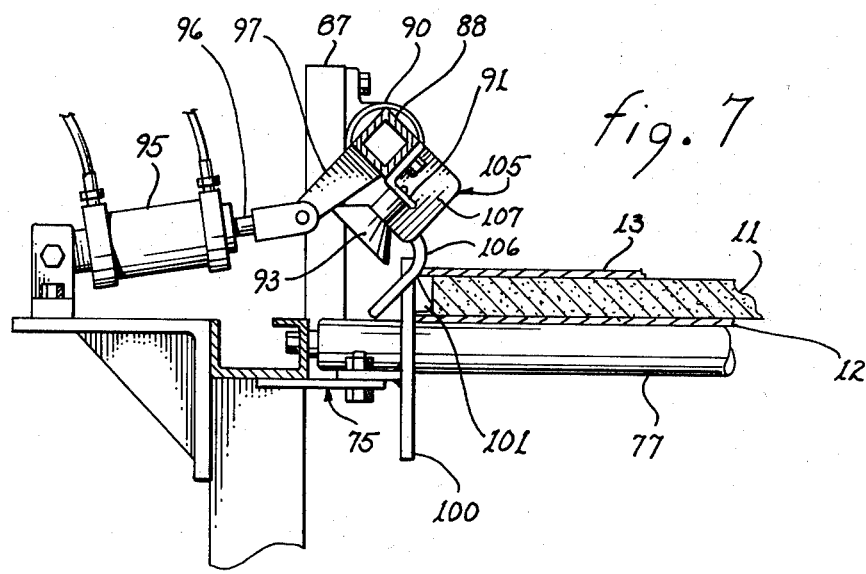
FIG. 7 is a partial view illustrating movement of a pivotable member of the index table.
Figure 9:
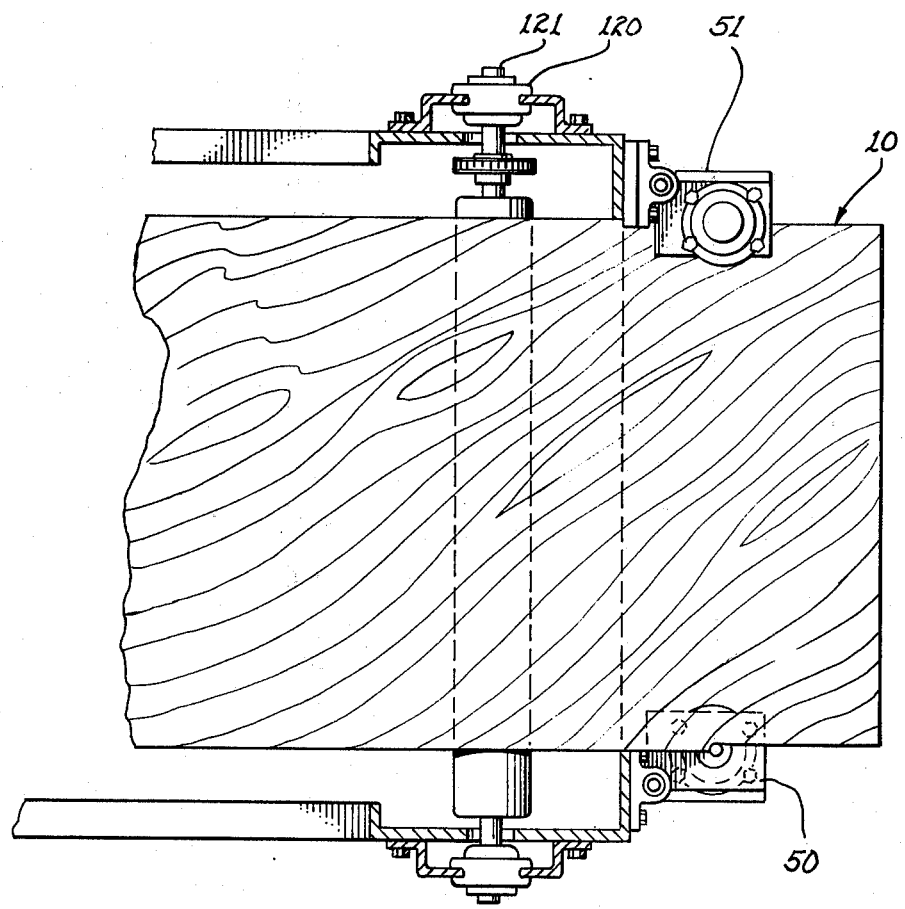
FIG. 9 is a partial top view of trimmers disposed at the discharge end of the heat tunnel.
Figure 8:
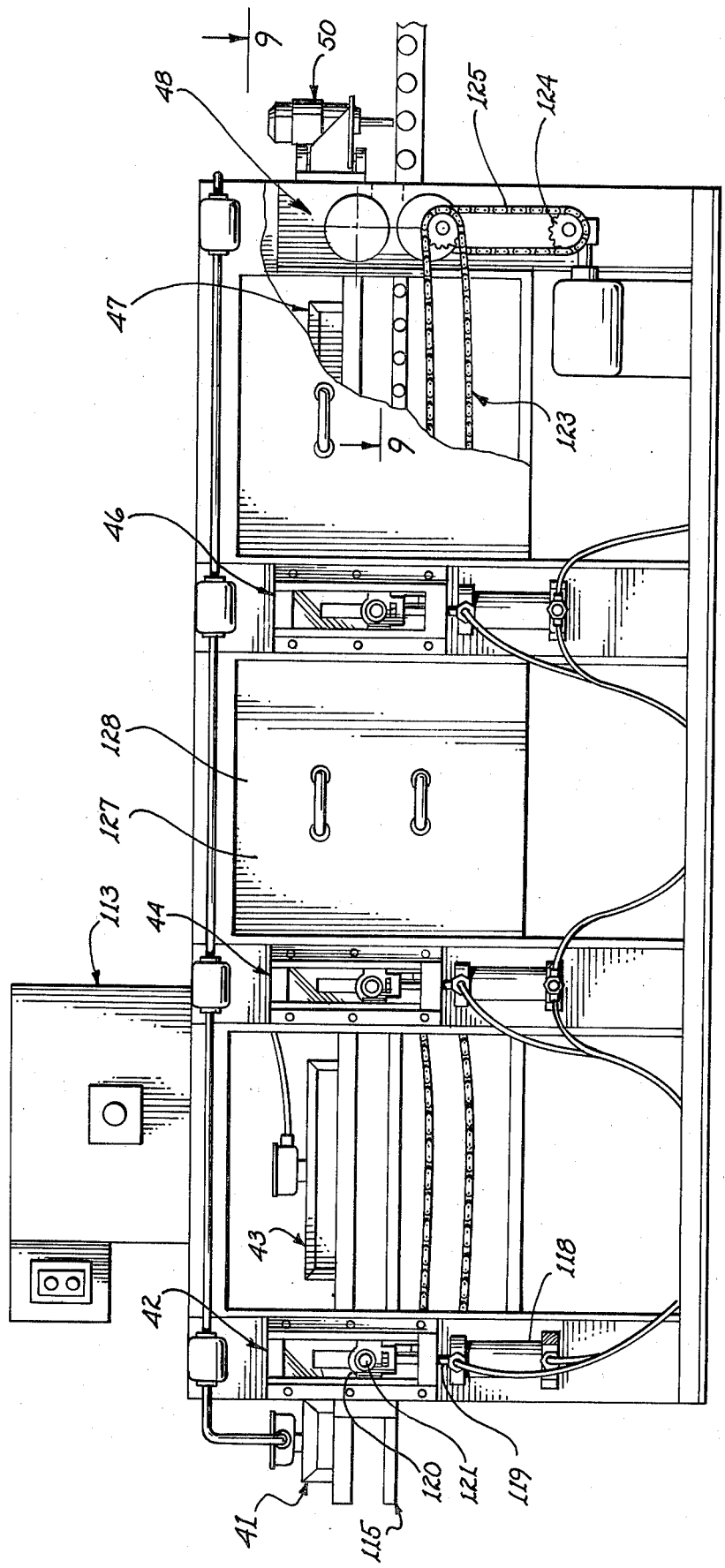
FIG. 8 is a partial cutaway view of a heat tunnel.

Indexing table 35 will be described with primary and joint reference to FIGS. 5, 6 and 7. Frame 75, including a longitudinally oriented central support channel 76, supports a plurality of sets of rollers 77, 78, which rollers support and convey a composite unit. A pair of uprights 79 extend from frame 75 and support a square tube member 81. This member, via right angle flanges 82 and 83, supports cone-shaped rollers 84 and 85. Further uprights 86 and 87 extending from frame 75 support square tube member 88 through pillow blocks 89 and 90 or similar journal means. Right angle flanges 91 and 92, extending from member 88, support cone-shaped rollers 93 and 94. A pneumatically or electrically operated solenoid 95 includes a plunger 96 pivotally attached to the end of arm 97 extending from member 88.

Indexing fence sections 100 are attached to frame 75 and serve as a laterally oriented reference for the composite unit to be assembled. A triangular shaped hold-down member 101 extends inwardly from each fence section 100 with the lower surface 102 thereof being vertically positioned above the planar surface represented by rollers 77 by an amount compensurate with the thickness of bottom laminate 12. The inward extension of lower edge 103 of member 101 is commensurate with the degree of lateral overlap of laminate 12 along one side of substrate 11. The height of member 101 is commensurate with the thickness of substrate 11 such that the lateral edge of top laminate 13 is positionable essentially adjacent the inward surface of fence sections 100.

A longitudinal positioning guide 105 is attached to member 88 to index the longitudinal position of the laminates and the substrate. A lower prong 106 extends downwardly to a point beneath the plane identified by the tops of rollers 77. Thereby, the prong serves as an index for positioning laminate 12 along the longitudinal axis. Base 107 of guide 105 is horizontally commensurate with the cone-shaped surface of rollers 93 and 94 and serves as an index for positioning substrate 11 along the longitudinal axis. It may be noted that the contacting surface of base 107 is displaced from the contacting surface of prong 106 by a small amount, which amount is equivalent to the overlap of the laminate with respect to the substrate at the longitudinal end of the substrate.

The operation of index table 35 may be described as follows. In preparation for receipt of a substrate from spreader 25, bottom laminate 12 is laid upon rollers 77 and indexed against fence sections 100 and prong 106. It may be noted that a lateral edge of the laminate is disposed beneath surface 102 of hold-down members 101. Substrate 11, having adhesive applied to the top and bottom surfaces thereof, departs from spreader 25 to become supportingly engaged by the cone-shaped surfaces of rollers 84 and 85 along one side and the cone-shaped surfaces of rollers 93 and 94 along the other side. These rollers, as noted particularly in FIG. 6, support the lower lateral edges of the substrate whereby beads 14 and 14a of adhesive remain undisturbed. The longitudinal positioning of the substrate is indexed by base 107 of guide 105. After substrate 11 is positioned adjacent base 107, solenoid 95 is actuated.

Upon actuation of solenoid 95, plunger 96 will retract resulting in pivotal movement of arm 97 and rotation of member 88. Rotation of member 88 will tend to angularly and laterally outwardly displace substrate supporting rollers 93 and 94. The removal of support by these rollers will result in lateral movement of substrate 11 (to the left in FIG. 6), due to the slope of supporting cones 84 and 85, and the substrate will drop onto laminate 12. The positioning of substrate 11 with respect to laminate 12 is indexed and regulated by hold-down members 101 and the sloping surfaces 104 thereof. That is, the lower lateral edge of the substrate, being laterally displaced due to the lateral movement of the substrate, will strike the surfaces 104 and the substrate will slide downwardly therealong until it reaches point 102. This position is indicated in phantom lines in FIG. 6. By this step, the substrate rests upon bottom laminate 12 and the bottom laminate will overlap the substrate along the lateral and longitudinal edges.

Top laminate 13 is located with respect to substrate 11 by locating edge 15 thereof adjacent fence sections 100 and locating the longitudinal edge thereof adjacent prong 106. Thereafter, opposed lateral edge 16 is lowered until the laminate is positioned adjacent the upper surface of substrate 11. It may be noted that because of fence sections 100 and prong 106, top laminate 13 will overlap the underlying substrate along the longitudinal and lateral edges.

From the above description, it may be noted that substrate 11, with adhesive applied to opposed surfaces thereof, need not be handled by any workmen during application of the laminates. Moreover, the operation described renders it unnecessary and unlikely that the pattern of adhesive will, in any way, be disturbed during positioning and attachment of the laminates.

After the unit has been assembled by the above procedure, it is conveyed along rollers 77 to the inlet of heat tunnel 40.

At the inlet to heat tunnel 40, a preheater 41 applies heat to the composite unit while supported upon receiving fingers 115. Pressure roller unit 42 includes a vertically fixed driving roller 116 and a vertically loaded and positionable roller 117. The pressure applied intermediate rollers 116 and 117 is regulated by means of application of pressure by a piston and cylinder unit 118 acting through a plunger 119. The plunger is fixedly attached to pillow blocks or journals 120 rotatably supporting shaft 121 of roller 117. Similar apparatus is employed for further pressure roller units 44, 46 and 48. A chain drive mechanism 123 interconnects sprockets attached to each of driving rollers 116 and applies the power supplied by power sprocket 124 through chain 125.

The pressure applied by each set of pressure roller units within the heat tunnel may be of a uniform and predetermined for any given combination of substrate, laminates and adhesive. Alternately, the pressure of the initial set or sets of pressure roller units may be less than that of the remaining pressure roller units for the succeeding sets of pressure roller units may exert progressively greater pressure upon the composite unit passing therethrough. The selection of the pressures to be exerted are best determined by one skilled in the art having knowledge of the nature, type and porosity of the substrate and laminates, the type and nature of the adhesive with due consideration of the curing or setting characteristics thereof in the presence of a predetermined temperature environment and the rapidity and amount of vapor generation.

Each of heating elements 43, 45 and 47 is disposed within individual but interconnected compartments accessible through doors 127 and 128. Although only a single heating element disposed in the upper part of each compartment is shown, it is to be understood that further heating units may be employed in the lower part of one or more of the compartments. These heating units, being regulated by means of controls within a control panel 130, apply heat to the composite unit to effect curing of the adhesive bonding the laminates to the substrate of each composite unit passing through the heat tunnel.

The heat applied to the composite unit directly affects the generation and rapidity of vapor generation during curing of the adhesive. If any vapor generated cannot be absorbed by the substrate or transmitted out of the composite unit at a sufficiently fast rate, bubbles may form to lift sections of laminate from the substrate. The sets of pressure roller units tend to preclude such lifting, but they may be insufficient if the vapor generation is very rapid due to a too high temperature environment. This problem is particularly acute where impervious or very low porosity laminates are used. Accordingly, the preferred environment is one in which the adhesive will not vaporize, or at most, only slightly so, and where the moisture from the adhesive during curing is driven into the substrate itself.

For water based adhesives, vapor is generated if the adhesive is at a temperature of about 170° F. or higher, yet curing time of the adhesive is reduced with temperature. By experimentation, it has been determined that an adhesive temperature in the range of 140°–170° F. promotes rapid curing with minimum danger of vapor generation and the preferred temperature is 160° F. To achieve these temperatures of the adhesive, the ambient temperature in the heat tunnel may be in the range of 160°–360° F. with the preferred ambient temperature being 250° F.

By maintaining the above temperatures, the sets of pressure roller units can readily maintain the laminates adjacent the substrate to the extent of forcing the moisture emanating from the adhesive into the substrate.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for adhering first and second laminates to lower and upper opposed surfaces, respectively, of a substrate to form a composite unit, said apparatus comprising in combination:
   (a) means for applying a pattern of adhesive to the upper and lower opposed surfaces of the substrate;
   (b) means for locating and positionally maintaining the first laminate at a fixed location to contactingly receive the lower surface of the substrate;
   (c) means for transporting the substrate from said applying means into an indexed relationship with the first laminate at the fixed location;
   (d) means for indexing the substrate upon the first laminate and maintaining the substrate in indexed relationship thereto, said indexing means including means for insetting the lateral and longitudinal edges of the substrate interior to the commensurate edges of the first laminate;
   (e) further means for locating and positionally maintaining the second laminate at the fixed location to contactingly engage the upper surface of the substrate in indexed relationship thereto; and
   (f) said indexing means including means for overlapping the lateral and longitudinal edges of the second laminate with respect to the corresponding edges of the substrate; whereby, the lateral and longitudinal edges of the composite unit overlap the corresponding edges of the substrate.

2. The apparatus as set forth in claim 1 wherein the substrate is at least semi-rigid and said transporting means includes means for supporting the substrate along the lateral edges thereof.

3. The apparatus as set forth in claim 2 wherein said supporting means comprises sloping elements for laterally and vertically supporting the lateral edges of the substrate.

4. The apparatus as set forth in claim 3 wherein said supporting means comprises cone-shaped rollers.

5. The apparatus as set forth in claim 4 wherein said positioning means comprises:
   (a) a pivotable member for supporting said cone-shaped rollers along one lateral edge of the substrate; and
   (b) means for pivoting said member to withdraw said cone-shaped rollers from supporting engagement of the one lateral edge of the substrate;
whereby, said cone-shaped rollers support the substrate during positioning thereof and withdraw to allow deposition of the substrate upon the first laminate.

6. The apparatus as set forth in claim 5 wherein said positioning means includes a guide extending from said member and a base of said guide for contacting the longitudinal end of the substrate.

7. The apparatus as set forth in claim 6 wherein said locating means includes at least one fence section for locating one lateral edge of the first laminate.

8. The apparatus as set forth in claim 7 wherein said positioning means further includes hold down means extending from said fence sections for locating the one lateral edge of the substrate.

9. The apparatus as set forth in claim 7 wherein said further locating means comprises a prong extending from said guide for contacting the longitudinal end of the first laminate.

10. The apparatus as set forth in claim 9 including trimmers for trimming the lateral edges of the composite unit.

11. The apparatus as set forth in claim 1 including means for applying pressure at a location remote from the fixed location to force the first and second laminates to the substrate and heat curing the adhesive to form the composite unit, said applying means comprising:
   (a) a plurality of sets of roller units for sequentially compressing the first and second laminates to the substrate; and
   (b) heating elements disposed intermediate said sets of roller units for heating the adhesive through the laminates to promote curing of the adhesive.

12. The apparatus as set forth in claim 11 including trimmers for trimming the lateral edges of the composite unit after curing of the adhesive.

13. The apparatus as set forth in claim 12 including a feed table for introducing the substrates into said applying means.

14. The apparatus as set forth in claim 13 further including a receiving table for receiving the trimmed composite units.

15. The apparatus as set forth in claim 1 including trimmers for trimming the lateral edges of the composite unit after curing of the adhesive.

16. A method for adhering first and second laminates to lower and upper surfaces, respectively, of an at least semi-rigid substrate, said method comprising the steps of:
 (a) applying a pattern of adhesive to the upper and lower opposed surfaces of the substrate;
 (b) locating and positionally maintaining the first laminate in a fixed location to contactingly receive the lower surface of the substrate;
 (c) transporting the substrate into an indexed relationship with the first laminate at the fixed location;
 (d) indexing the substrate upon the first laminate and maintaining the substrate in indexed relationship thereto, including the steps of inserting the lateral and longitudinal edges of the substrate interior to the commensurate edges of the first laminate;
 (e) locating and positionally maintaining the second laminate at the fixed location to contactingly engage the upper surface of the substrate in indexed relationship thereto; and
 (f) overlapping the lateral and longitudinal edges of the second laminate with respect to the corresponding edges of the substrate; whereby, the lateral and longitudinal edges of the composite unit overlaps the corresponding edges of the substrate.

17. The method as set forth in claim 16 wherein said step of positioning includes the step of indexing a lateral edge and a longitudinal edge of the substrate in a predetermined relationship with the corresponding lateral and longitudinal edges of the first laminate at the fixed location.

18. The method as set forth in claim 17 wherein said step of locating the second laminate includes the step of indexing a lateral edge and a longitudinal edge of the second laminate in a predetermined relationship with the corresponding lateral and longitudinal edges of the substrate at the fixed location.

19. The method as set forth in claim 18 including the step of trimming the lateral edges of the composite unit.

20. Apparatus for adhering first and second laminates to lower and upper opposed surfaces, respectively, of a substrate to form a composite unit, said apparatus comprising in combination:
 (a) means for applying a pattern of adhesive to the upper and lower opposed surfaces of the substrate;
 (b) means for locating and positionally maintaining the first laminate at a fixed location to contactingly receive the lower surface of the substrate;
 (c) means for transporting the substrate from said applying means into an indexed relationship with the first laminate at the fixed location;
 (d) means for indexing the substrate upon the first laminate and maintaining the substrate in indexed relationship thereto, said indexing means including means for insetting at least two edges of the substrate interior to the commensurate edges of the first laminate;
 (e) further means for locating and positionally maintaining the second laminate at the fixed location to contactingly engage the upper surface of the substrate in indexed relationship thereto; and
 (f) said indexing means including means for overlapping at least two edges of the second laminate with respect to the corresponding edges of the substrate; whereby, at least two edges of the composite unit overlap the corresponding edges of the substrate.

21. The apparatus as set forth in claim 20 wherein the substrate is at least semi-rigid and said transporting means includes cone-shaped rollers for supporting the substrate along the lateral edges thereof.

22. The apparatus as set forth in claim 21 wherein said positioning means comprises:
 (a) a pivotable member for supporting said cone-shaped rollers along one lateral edge of the substrate; and
 (b) means for pivoting said member to withdraw said cone-shaped rollers from supporting engagement of the one lateral edge of the substrate; whereby, said cone-shaped rollers support the substrate during positioning thereof and withdraw to allow deposition of the substrate upon the first laminate.

23. The apparatus as set forth in claim 22 wherein said locating means includes at least one fence section for locating one lateral edge of the first laminate and said positioning means includes a guide extending from said member, said guide having a base for contacting the longitudinal end of the substrate and hold down means extending from said fence sections for locating the one lateral edge of the substrate.

24. The apparatus as set forth in claim 23 wherein said further locating means comprises a prong extending from said guide for contacting the longitudinal end of the first laminate.

25. The apparatus as set forth in claim 24 including trimmers for trimming the lateral edges of the composite unit.

26. The apparatus as set forth in claim 20 including means for applying pressure at a location remote from the fixed location to force the first and second laminates to the substrate and heat curing the adhesive to form the composite unit, said applying means comprising:
 (a) a plurality of sets of roller units for sequentially compressing the first and second laminates to the substrate; and
 (b) heating elements disposed intermediate said sets of roller units for heating the adhesive through the laminates to promote curing of the adhesive.

27. The apparatus as set forth in claim 26 including trimmers for trimming the lateral edges of the composite unit after curing of the adhesive.

28. The apparatus as set forth in claim 27 including a feed table for introducing the substrates into said applying means.

29. The apparatus as set forth in claim 28 further including a receiving table for receiving the trimmed composite units.

30. The apparatus as set forth in claim 16 including trimmers for trimming the lateral edges of the composite unit after curing of the adhesive.

31. A method for adhering first and second laminates to lower and upper surfaces, respectively, of an at least semi-rigid substrate, said method comprising the steps of:
 (a) applying a pattern of adhesive to the upper and lower opposed surfaces of the substrate;
 (b) locating and positionally maintaining the first laminate in a fixed location to contactingly receive the lower surface of the substrate;
 (c) transporting the substrate into an indexed relationship with the first laminate at the fixed location;
 (d) indexing the substrate upon the first laminate and maintaining the substrate in indexed relation thereto, including the steps of inserting at least two edges of the substrate interior to the commensurate edges of the first laminate;

(e) locating and positionally maintaining the second laminate at the fixed location to contactingly engage the upper surface of the substrate in indexed relationship thereto; and (f) overlapping at least two edges of the second laminate with respect to the corresponding edges of the substrate; whereby, at least two edges of the composite unit overlaps the corresponding edges of the substrate.

32. The method as set forth in claim 31 wherein said step of positioning includes the step of indexing at least two edges of the substrate in a predetermined relationship with the corresponding edges of the first laminate at the fixed location.

33. The method as set forth in claim 32 wherein said step of locating the second laminate includes the step of indexing at least the two edges of the second laminate in a predetermined relationship with the corresponding edges of the substrate at the fixed location.

34. The method as set forth in claim 33, including the step of trimming the inset edges of the composite unit.

35. Apparatus for adhering at least one laminate to a surface of a substrate to form a composite unit, said apparatus comprising in combination:

(a) means for applying a pattern of adhesive to at least one surface of the substrate;

(b) means for transporting the substrate from said applying means to a fixed location, said transporting means including two parallel rows of bearing member means for vertically and laterally supporting opposed lower edges of the substrate on a sloping surface;

(c) means for indexing the substrate with respect to the fixed location and maintaining the substrate in indexed relationship thereat, said indexing means including:

i. means for repositioning one of said rows of bearing member means to withdraw the vertical and lateral support for the respective edge of the substrate, whereby the unsupported edge of the substrate will drop and the sloping surface of the other of said rows of bearing member means will cause the substrate to slide laterally until vertical support therefor ceases, causing the substrate to drop; and ii. means for contactingly receiving the first dropped edge of the substrate and positioning the edge at a predetermined place at the fixed location;

(d) means for locating and positionally maintaining a laminate at the fixed location to contactingly engage the adhesive bearing surface of the substrate in indexed relationship thereto;

(e) said indexing means further including means for insetting at least two edges of the substrate with respect to the corresponding edges of the laminate; whereby, the laminate is mated with the substrate such that at least two edges of the composite unit overlap the corresponding edges of the substrate.

36. The apparatus as set forth in claim 35 wherein each row of said bearing member means comprises a row of cone-shaped rollers.

37. The apparatus as set forth in claim 36 wherein said repositioning means comprises:

(a) a pivotable member for supporting one row of said cone-shaped rollers along one lateral edge of the substrate; and (b) means for pivoting said member to withdraw one row of said cone-shaped rollers from supporting engagement of the one lateral edge of the substrate; whereby, said cone-shaped rollers support the substrate during positioning thereof and withdraw to allow deposition of the substrate upon the fixed location.

38. The apparatus as set forth in claim 27 wherein said repositioning means includes a guide extending from said pivotable member and a base of said guide for contacting the longitudinal end of the substrate.

39. The apparatus as set forth in claim 38 wherein said positioning means further includes hold down means extending from said fence sections for locating the one lateral edge of the substrate.

40. The apparatus as set forth in claim 29 wherein said locating means comprises a prong extending from said guide for contacting the longitudinal end of the first laminate.

41. A method for adhering at least one laminate to a surface of a substrate to form a composite unit, said method comprising the steps of:

(a) applying a pattern of adhesive to at least one surface of the substrate;

(b) transporting the substrate to a fixed location, said transporting step including the step of vertically and laterally supporting opposed lower edges of the substrate by two parallel rows of bearing members having slopping surfaces;

(c) indexing the substrate with respect to the fixed location and maintaining the substrate in indexed relationship thereat, said indexing step including the steps of:

i. repositioning one of the rows of bearing members to withdraw the vertical and lateral support for the respective edge of the substrate, whereby the unsupported edge of the substrate will drop and the sloping surface of the other of the row of bearing members will cause the substrate to slide laterally until vertical support therefor ceases, causing the substrate to drop; and ii. contactingly receiving the first dropped edge of the substrate and positioning the edge at a predetermined place as the fixed location;

(d) locating and positionally maintaining a laminate at the fixed location to contactingly engage the adhesive bearing surface of the substrate in indexed relationship thereto;

(e) said indexing step further including the step of insetting at least two edges of the substrate with respect to the corresponding edges of the laminate; whereby, the laminate is mated with the substrate such that at least two edges of the composite unit overlap the corresponding edges of the substrate.

42. The method as set forth in claim 41 wherein said step of repositioning includes the step of indexing at least two edges of the substrate in a predetermined relationship with the corresponding edges of the laminate at the fixed location.

* * * * *